United States Patent Office 2,783,279
Patented Feb. 26, 1957

2,783,279
HALOGENATED TRIS PHENOL GERMICIDAL COMPOUNDS

Max E. Chiddix, Easton, Pa., assignor to General Aniline & Film Corporation, New York, N. Y., a corporation of Delaware No Drawing. Application November 29, 1955, Serial No. 549,888

7 Claims. (Cl. 260—619)

The present invention relates to new compounds having the formula

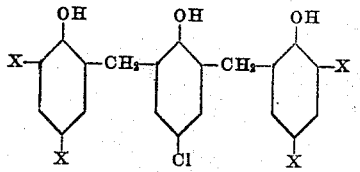

wherein X is selected from the group consisting of bromine and chlorine, and the metal and amine salts thereof, and to a process for preparing said compounds.

These compounds may be prepared by treating 5-chloro-2-hydroxy-$\alpha,\alpha'$-m-xylenediol with the corresponding 2,4-dihalophenol in the presence of a concentrated (preferably 80%) sulfuric acid. The reaction proceeds as follows:

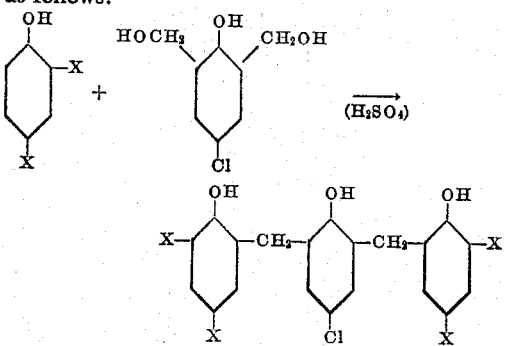

It is also possible to effect this condensation in the presence of other acid catalysts such as hydrogen chloride or a basic catalyst such as sodium hydroxide. These compounds may also be made from 4,$\alpha^2$,$\alpha^6$-trichloro-2,6-xylenol by condensation with the corresponding 2,4-dihalophenol in the presence of anhydrous aluminum chloride. They may also be prepared by bromination or chlorination of a 4-chloro-$\alpha^2$,$\alpha^6$-bis (5-chloro- or bromo-2-hydroxyphenyl)-2,6-xylenol.

These compounds are valuable as preservatives, disinfectants, fungicides, or insecticides and particularly as germicides in soap or other surface active or detergent compositions such as alkyl sulfonates, alkylaryl sulfonates, alkylated phenol polyoxyalkylene ethers, alcohol sulfates, sulfonated amides, and the like. Surprisingly, these compounds have been found to be up to several times as effective as germicides in the presence of soap as compared with related compounds having a different number and orientation of chlorine groups which have been made. While most phenolic compounds show decreased activity when incorporated in soap, the subject compounds are just as effective in the presence of soap as in its absence.

These compounds are also good anti-oxidants, ultra-violet absorbers and liquid dielectrics. Further, they are useful in mildew preventatives, dental creams, face creams, and ointments used in the treatment of "athlete's foot," skin infections, and the like. The following examples are illustrative only of preferred embodiments of this invention and are not to be regarded as limitative. Parts are by weight unless otherwise indicated.

EXAMPLE 1

4-chloro-$\alpha^2$,$\alpha^6$-bis(3,5 - dichloro - 2 - hydroxyphenyl)-2,6-xylenol.

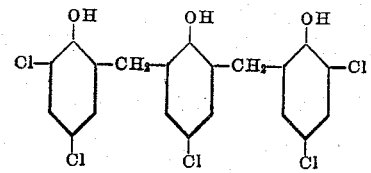

In a vessel equipped with a stirrer and thermometer were placed 200 parts by weight 100% sulfuric acid and 300 parts glacial acetic acid. This acid mixture was cooled to 65° C. and 81.5 parts distilled 2,4-dichlorophenol, B. P. 127°/5 mm. was added. The temperature was held at 60–70° C. and 47.1 parts 5-chloro-2-hydroxy-$\alpha,\alpha'$-m-xylenediol, M. P. 160–1° C., was added gradually. A tan solid began to precipitate out shortly before the addition was complete. The reaction mixture was stirred at 65–70° C. for one hour, then allowed to cool to room temperature. The solid was filtered off, washed with water, and dried. The crude product weighed 117 parts (97.5% of the theoretical yield) and had a melting point of 163–7° C. Three recrystallizations from toluene gave a white crystalline product with a melting point of 179–80° C.

Analysis.—Calculated for $C_{20}H_{13}O_3Cl_5$: Cl, 37.03. Found: Cl, 36.83. The product is soluble in acetone, ethanol, methanol, sparingly soluble in xylene and toluene and insoluble in water and petroleum ether.

EXAMPLE 2

4-chloro-$\alpha^2$,$\alpha^6$-bis(3,5 - dibromo - 2 - hydroxyphenyl)-2,6-xylenol.

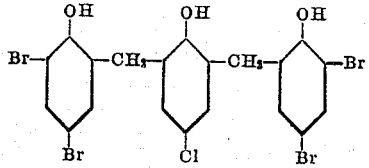

In a vessel equipped with a stirrer and thermometer was placed 40 parts 100% sulfuric acid and 60 parts glacial acetic acid. This acid mixture was cooled to 65° C. and 25.2 parts distilled 2,4-dibromophenol was added. The temperature was held at 65–70° C. and 9.5 parts 5-chloro-2-hydroxy-$\alpha,\alpha'$-m-xylenediol, M. P. 160–1° C. was added gradually. A white solid began to precipitate out shortly before the addition was complete. The reaction mixture was stirred at 65–70° C. for one hour, then allowed to cool to room temperature. The solid was filtered off, washed with water, and dried. The crude product weighed 31.8 parts (97.0% of the theoretical yield) and had a melting point of 226–228° C. Recrystallizations from benzene and methanol-water gave a crystalline product with a melting point of 230–1° C.

Analysis.—Calculated for $C_{20}H_{13}O_3ClBr_4$: C, 36.59; H, 2.00. Found: C, 36.65; H, 2.21.

EXAMPLE 3

4-chloro-$\alpha^2$,$\alpha^6$-bis(3 - bromo - 5 - chloro - 2 - hydroxyphenyl)-2,6-xylenol.

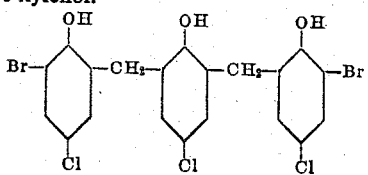

In a vessel equipped with a stirrer, thermometer, dropping funnel, and gas outlet was charged 20.5 parts 4-chloro-$\alpha^2,\alpha^6$-bis(5-chloro-2-hydroxyphenyl)-2,6 - xylenol in 210 parts glacial acetic acid. The mixture was stirred at room temperature and 16.0 parts bromine in 52.5 parts acetic acid was added in 1½ hours. The temperature rose from 25–30° C. during the addition, and the mixture was stirred at room temperature for two hours, heated to 80° C., cooled to 60° C., and stirred at 60–70° C. for one hour. The mixture was poured into water, and the solid was filtered, washed, and dried. The crude product weighed 26.9 g. (94.7% of the theoretical yield) and melted at 190–8° C. Two crystallizations from toluene yielded an analytical sample which melted at 204–5° C.

Analysis for $C_{20}H_{13}Br_2Cl_3O_3$.—Percent Br theory 28.16. Found: 28.15, 28.36.

The above compounds were found to have highly unusual bacteriostatic and bactericidal power, when tested by the following methods. Two different types of tests were used to evaluate the various compounds as soap germicides. One of these was a bactericidal test, which measured the ability of the sample to kill bacteria. The second was a bacteriostatic test, which measured the extent to which the compound was able to prevent bacterial multiplication. Both of these tests were conducted in the presence of soap and a synthetic detergent.

*Compounds tested*

A. 4 - chloro - $\alpha^2,\alpha^6$ - bis(3,5 - dichloro - 2 - hydroxyphenyl)-2,6-xylenol.

B. 4 - chloro - $\alpha^2,\alpha^6$ - bis(3,5 - dibromo - 2 - hydroxyphenyl)-2,6-xylenol.

C. 4 - chloro - $\alpha^2,\alpha^6$ - bis(3 - bromo - 5 - chloro - 2 - hydroxyphenyl)-2,6-xylenol.

D. 4 - chloro - $\alpha^2,\alpha^6$ - bis(5 - chloro - 2 - hydroxy-(phenyl)-2,6-xylenol.

E. 4 - chloro - $\alpha^2,\alpha^6$ - bis(3,5,6 - trichloro - 2 - hydroxyphenyl)-2,6-xylenol.

F. 2,2'-methylenebis-4-chlorophenol.

G. 2,2'-methylenebis-4,6-dichlorophenol.

H. 2,2'-methylenebis-3,4,6-trichlorophenol.

*Bactericidal test*

MATERIALS (1) Soap—4% solution of soap granules; germicide at a concentration of 2% of soap or 0.08% in the solution.

(2) Detergent—3.5% solution of an alkyl sulfate base detergent; germicide at a concentration of 2% of detergent or 0.07% in the solution.

(3) Difco Bacto-nutrient agar.

(4) F. D. A. (U. S. Food & Drug Administration) nutrient broth.

(5) Tryptone—glucose extract agar.

ORGANISM

*Staphylococcus aureus* 209 (now known officially as *Micrococcus pyogenes* var. *aureus*, Bergey VI) is maintained on tryptone-glucose extract agar. Three consecutive transfers are made from this stock culture in F. D. A. broth at 24 hour intervals. The third transfer is used and contains about 500,000,000 organisms per ml.

PROCEDURE

Sterile contact tubes containing 10 ml. of the soap-germicide solution are placed in a 37° C. water bath and permitted to reach temperature. One ml. of the test organism culture is added to each tube and mixed well. After 5 minutes contact at 37° C., one ml. is removed from each contact tube and diluted to 100 ml. with sterile distilled water. Since a number of tests are run at the same time, this dilution usually stands for about 15–20 minutes before further dilution and plating.

Dilutions of 1–1,000 and 1–10,000 are plated in nutrient agar. The plates are incubated for 48 hours at 37° C. and then counted. The numbers reported are those bacteria remaining alive from the original 1 ml. sample which was removed from the contact tube. All tests are run in duplicate.

*Bacteriostatic test*

MATERIALS (1) F. D. A. nutrient broth.

(2) 0.005%, 0.05%, and 0.5% solutions of soap granules (Ivory Snow).

(3) 0.005%, 0.05%, and 0.5% solution of alkyl sulfate base detergent (Dreft).

(4) 0.001%, 0.01%, and 0.1% alcoholic solution (or acetone if necessary) of germicide.

ORGANISM

*Staphylococcus aureus* 209, as described in the bactericidal test.

PROCEDURE

Five tubes of broth are used for each dilution tested. Each tube contains 10 ml. of sterile broth, 1 ml. of the appropriate detergent dilution, 0.1 ml. of the correct germicide solution, and 0.1 ml. of broth culture as the inoculum. The ratio of detergent to germicide is always 50:1, as before. The concentrations of germicide tested in the final tubes were 1–100,000 and 1–1,000,000. If the germicide was effective at 1–1,000,000, it was also tested at 1–10,000,000. The turbidity of the solutions are read at zero time in the Coleman Spectrophotometer, Model 6A, at 610. After 24 hours incubation at 37° C., turbidity readings are repeated. Increased turbidity is taken as evidence of growth. No change indicates bacteriostatic action. Changes of 5 units, or less, show activity at that concentration.

TABLE

*Evaluation of germicides*

BACTERICIDAL TEST [1]

| Compound | Soap | Detergent |
|---|---|---|
| (1) Blank | 300,000 | 30,000 |
| (2) A | 0 | 0 |
| (3) B | 7,000 | 25 |
| (4) C | 0 | 0 |
| (5) D | 101,000 | 3,700 |
| (6) E | 31,000 | 1,250 |
| (7) F | 409,000 | 8,900 |
| (8) G | 9,000 | 9,500 |
| (9) H | 32,000 | 7,000 |

BACTERIOSTATIC TEST [2]

| Compound | Soap | | Detergent | |
|---|---|---|---|---|
| | 1-1 Million | 1-10 m. | 1-1 m. | 1-10 m. |
| (1) Blank | 40 | 48 | 40 | 48 |
| (2) A | 0 | 5 | 0 | 0 |
| (3) B | 4 | 13 | 0 | 31 |
| (4) C | 5 | 31 | 0 | 30 |
| (5) D | 17 | ------ | 12 | ------ |
| (6) E | 2 | 35 | 2 | 26 |
| (7) F | 38 | ------ | 32 | ------ |
| (8) G | 2 | 40 | 3 | 49 |
| (9) H | 1 | 16 | 1 | 16 |

[1] Surviving organisms per ml. recovered after 5 min. contact with approximately 50,000,000 per ml. at zero time. Each figure is an average of at least four separate tests.
[2] These values are given as percent change of light transmission (0–24 thurs incubation). The 1–1,000,000 values are the average of at least two oests (five replicates).

The salts of the compounds of the present invention may be prepared by reacting the compounds in a dilute or concentrated solution of sodium hydroxide or the like. In combination with soap the compounds apparently also yield a salt. In the latter case the salt is a mono salt, since apparently only one of the hydroxyl groups reacts with the soap. The alkali metal salts formed with concentrated alkali may be mono-, di- or tribasic salts. They vary in water solubility with the monosodium salt, for example, sparingly soluble in water and the di- and trisodium salts much more water-soluble. Suitable bases include the hydroxides of lithium, sodium, potassium and ammonium, as well as primary, secondary and tertiary alkylamines and alkanolamines such as methylamine, butylamine, diethylamine, triethylamine, piperidine, ethanolamine, diethanolamine, and triethanolamine. Also, somewhat less soluble salts may be formed with calcium, barium, magnesium, zinc, copper, aluminum, etc. It will be understood that as employed herein and in the appended claims, the instant compounds and their salts as described above are to be regarded as equivalent.

This invention has been disclosed with respect to certain preferred embodiments, and various modifications and variations thereof will become obvious to those skilled in the art. It is to be understood that such modifications and variations are to be included within the spirit and purview of this application and the scope of the appended claims. This application is a continuation-in-part of application Serial No. 216,110, filed March 16, 1951, now abandoned.

I claim:
1. Compounds selected from the group consisting of those having the formula

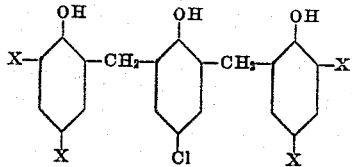

wherein X is selected from the group consisting of chlorine and bromine, and the metal and amine salts thereof.

2. A compound having the formula

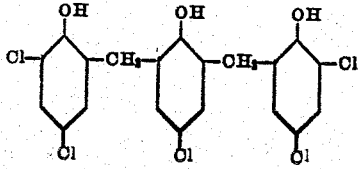

3. A compound having the formula

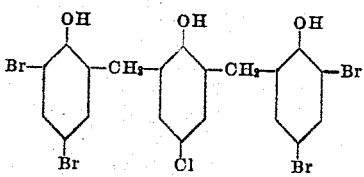

4. A compound having the formula

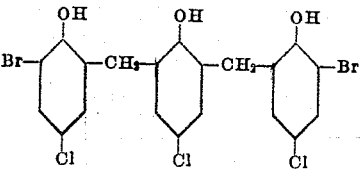

5. A process which comprises reacting one mole of 5-chloro-2-hydroxy-α,α'-m-xylenediol with two moles of a 2,4-dihalophenol, wherein the halogen is selected from the group consisting of chlorine and bromine, in the presence of a catalyst selected from the group consisting of concentrated sulfuric acid, hydrogen chloride and sodium hydroxide.

6. A process which comprises reacting one mole of 5-chloro-2-hydroxy-α,α'-m-xylenediol with two moles of 2,4-dichlorophenol in the presence of concentrated sulfuric acid.

7. A process which comprises reacting one mole of 5-chloro-2-hydroxy-α,α'-m-xylenediol with two moles of 2,4-dibromophenol in the presence of concentrated sulfuric acid.

No references cited.